United States Patent [19]

Hickman

[11] 4,070,056
[45] Jan. 24, 1978

[54] UTILITY VEHICLE DOOR AND SEAL

[75] Inventor: Kim Michael Hickman, Colorado Springs, Colo.

[73] Assignee: White Automotive Corporation, Colorado Springs, Colo.

[21] Appl. No.: 695,169

[22] Filed: June 11, 1976

[51] Int. Cl.² .............................................. B60J 5/04
[52] U.S. Cl. .................................... 296/148; 49/501; 52/291
[58] Field of Search ...................... 296/146, 147, 148; 52/291; 49/501

[56] References Cited

U.S. PATENT DOCUMENTS

| 2,460,399 | 2/1949 | Schassberger | 296/148 |
| 2,620,224 | 12/1952 | Hedley | 296/148 |
| 2,682,427 | 6/1954 | Bright | 296/148 |
| 2,779,980 | 2/1957 | Rhodes | 52/291 |
| 3,055,700 | 9/1962 | Glas | 296/148 |
| 3,893,273 | 7/1975 | Sailor | 52/291 |

Primary Examiner—Joseph F. Peters, Jr.
Assistant Examiner—John A. Carroll
Attorney, Agent, or Firm—Sheridan, Ross, Fields & McIntosh

[57] ABSTRACT

The construction incorporating the invention is applied to a utility vehicle such as an open vehicle provided with a fabric top, in which the windshield forms the upper portion of the forward upright of the door frame and portions of the top form the lintel and at least part of the rear upright. An elongate seal member is attached to the inner face of the side edge of the windshield extending throughout its vertical length and is provided with a rearwardly extending rib to sealingly engage a portion of the door. The door comprises a skeletal framework having a border structure conforming to the shape of the door frame and covered with fabric, the framework being made of resilient material. The door is hung on the existing hinge mounts and its lower portion lies in a vertical plane corresponding to that of the lower portion of the door frame. Bends are formed at intermediate points in the height of the framework so that the plane of the upper portion angles inwardly and upwardly. When the door is closed the upper end of the sealing rib and continued movement to complete closure springs the upper part of the door so that it fits tightly against the rib and lintel and produces a weather tight seal.

11 Claims, 10 Drawing Figures

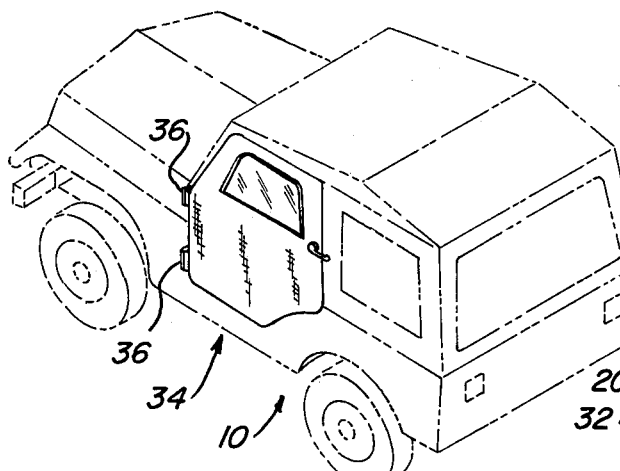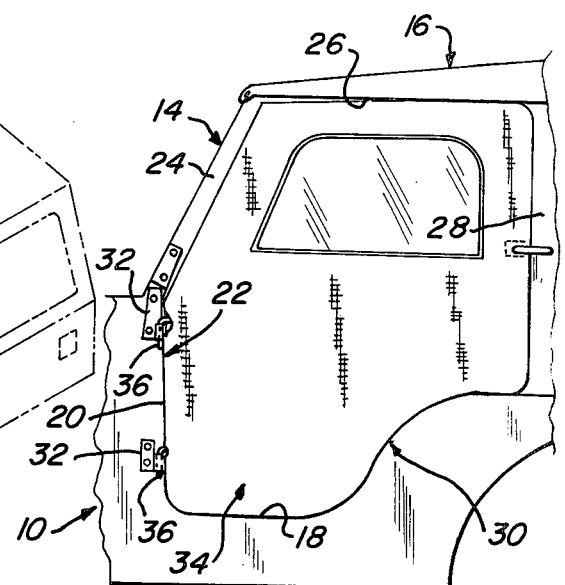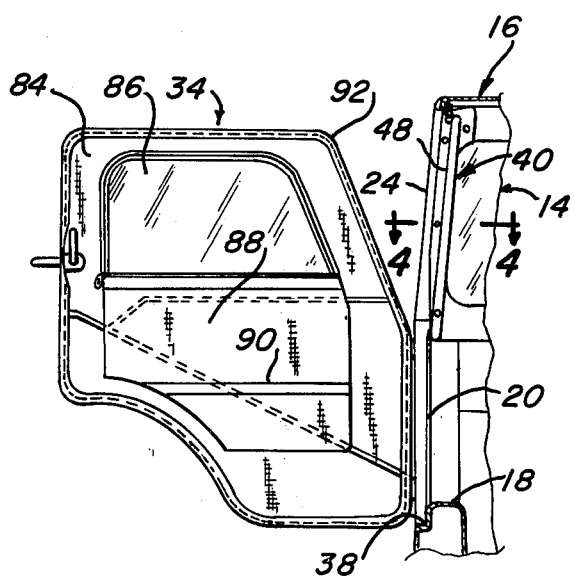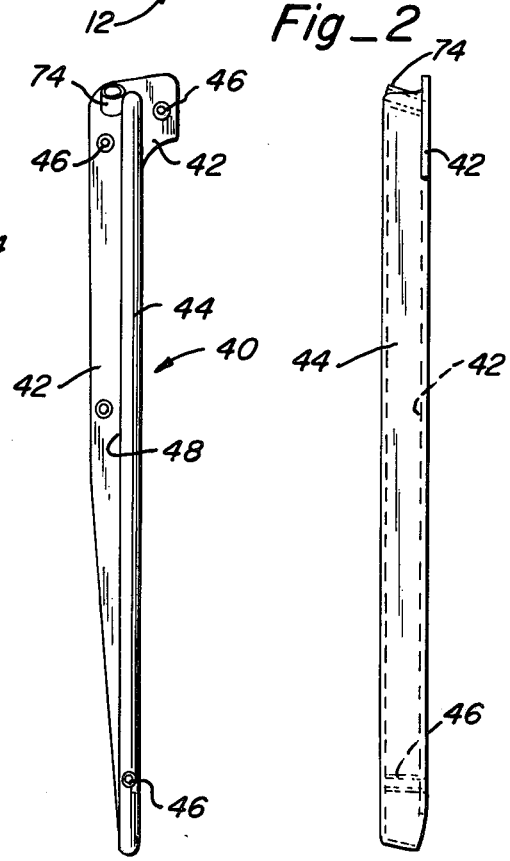
Fig_1
Fig_2
Fig_3
Fig_4
Fig_5
Fig_6

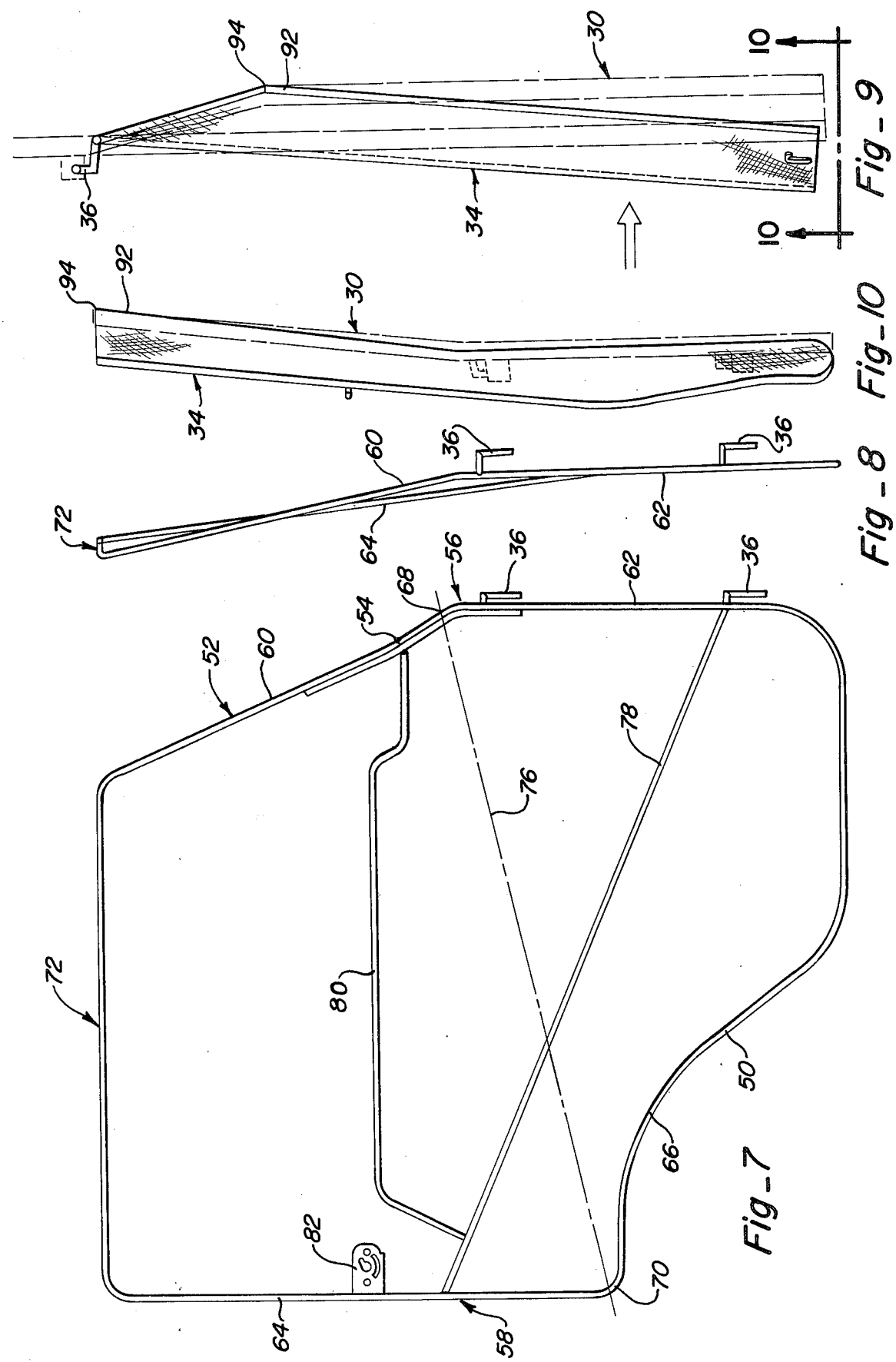

UTILITY VEHICLE DOOR AND SEAL

BACKGROUND OF THE INVENTION

The construction of this invention lies in the field of doors for use on vehicles and is directed to such door for utility vehicles such as Jeeps, Broncos, and other light trucks having an open body and a fabric top. It is more particularly directed to a door for such vehicles which replaces the original door and is pivotally mounted on the existing hinge mountings to provide a complete closure up to the vehicle top, and which fits the entire door frame opening in a secure and weather tight manner.

Many utility vehicles, such as Jeeps, are provided with open box type rear sections and doors. A so-called "hard top" may be purchased and mounted so that the vehicle becomes a closed car, and a rigid sedan-type door may be fitted. Many users prefer a "soft" or fabric top which may be lowered in good weather, and the doors which are furnished are usually minimum in weight, construction and quality.

Such doors are usually made with a light metal framework to provide a suitable shape and covered with fabric, and their mounting and operation leave much to be desired. In one typical arrangement applied to Jeeps, the existing hinge mountings, if any, are not used, and a hole is drilled in the upper part of the rearwardly slanted windshield frame and one vertically below it in the door sill. A vertical rod is inserted in these two holes and a minimum frame and fabric door is pivotally mounted on the rod.

Since the rod is aft of the rigid door frame and most of the height of the windshield, it is evident that the portion of the door forward of the rod must swing in the wrong direction. While such a door protects the occupant from wind gusts and the like it does not fit accurately at any point around its periphery and thus does not seal the interior against rain, snow, or wind leaks. It is generally unsatisfactory and does not provide a solution to the problem of weatherproofing a vehicle.

SUMMARY OF THE INVENTION

The construction of the present invention overcomes the difficulties mentioned above and provides a door which is simple and relatively inexpensive to construct, which may be mounted on the existing hinge mountings, and which fits accurately and tightly to produce a weatherproof seal.

Generally stated, the door of the present invention comprises a skeletal framework of resilient material, preferably steel, having a border structure conforming to the size and outline of the door frame to which it is to be applied and a fabric covering secured to the framework. The covering is applied to the outer side of the framework with margins folded over to the inner side and sewed in place. The lower portion of the forward marginal section of the framework is provided with a pair of vertically spaced outwardly and forwardly offset vertical hinge pins to engage in the existing hinge mountings on the vehicle and support the door for pivotal opening and closing movements in the conventional manner.

While the framework may vary in design and may utilize any suitable material, it is preferably made from steel rod material which is resilient enough for the purpose. In its present form a length of such steel rod is formed into a closed loop comprising a border structure, with the rod ends welded together. The loop is conformed to the size and outline of the door frame. At least one reinforcing rod extends between the forward and rear upright marginal sections and is welded to them to assits in maintaining the outline shape of the door.

The forward and rear upright marginal sections of the border structure are formed with bends at intermediate points to provide a lower portion of the door which lies in a substantially vertical reference plane and an upper portion which lies substantially in a plane angled upward and inward with respect to the reference plane. The angle of the bend is predeterminedly sufficient to cause interference contact of the upper marginal portion of the door with the door frame in advance of complete closure of the door.

In the example which is being described the vehicle body forms the lower portion of the forward upright of the door frame and provides an inside corner for sealing engagement with a closed door. The upper portion of the forward upright is formed by the windshield frame which has a generally planar rear face at its side edge which has poor sealing characteristics. To overcome this difficulty a sealing member is provided, which has a flat surface to contact the rear face of the side edge and to be secured thereto and a rearwardly directed rib, both the member and the rib extending throughout the vertical length of windshield margin. The rib provides an inside corner in continuation of the one provided by the body.

In the closing operation, the first contact is between the upper front corner of the door and the upper end of the rib. As closure continues under pressure by the operator the resilience of the framework material allows the upper portion of the door to yield back toward the reference plane, bending about the theoretical line of bend between the forward and rear bend points. Upon complete closure and latching, all parts of the periphery of the door are in sealing contact with the door frame, and the upper portion of the forward marginal section is in very tight spring-biased contact with the length of the rib. Thus an excellent seal is provided along the most critical part of the jointure from the standpoint of weatherproofing.

BRIEF DESCRIPTION OF THE DRAWINGS

Various other advantages and features of novelty will become apparent as the description proceeds in conjunction with the accompanying drawings, in which:

FIG. 1 is a perspective view of the door of the invention mounted on a vehicle shown in phantom;

FIG. 2 is a fragmentary side elevational view of the door and the associated portions of the vehicle;

FIG. 3 is a fragmentary elevational view of a portion of the vehicle body with the door in open position;

FIG. 4 is a sectional view taken on line 4—4 of FIG. 3;

FIG. 5 is a front elevational view of the sealing member;

FIG. 6 is a side elevational view of the sealing member;

FIG. 7 is a side elevational view of the framework of the door;

FIG. 8 is an edge elevational view of the framework of the door;

FIG. 9 is a top plan view of the door in initial closing contact position with the door frame shown in phantom; and FIG. 10 is an edge elevational view of the door looking in the direction of line 10—10 of FIG. 9.

DESCRIPTION OF PREFERRED EMBODIMENTS

The door of the invention is schematically illustrated in operative position in FIGS. 1 and 2, in which an automotive utility vehicle 10 is provided with a metal body 12, a windshield 14 and a fabric top 16. The opening in the side of the metal body provides a sill 18 and the lower portion 20 of the forward upright 22 of the total door frame. The side marginal frame 24 of the windshield provides the upper portion of upright 22. The top accross its forward end is connected to the upper margin of the windshield frame and is cut away at the side to form the lintel 26 and the rear upright 28. These elements combine to form a closed loop of predetermined size and outline defining the total door frame 30. Vertically spaced hinge mountings 32 are secured to the body just forward of the door frame to receive hinge pins 36 for pivotally supporting door 34.

The arrangement is shown in more detail in FIG. 3, in which it will be seen that sill 18 and portion 20 of the forward upright have a cross sectional shape which defines an inside corner 38 to sealingly engage the margin of the door. The rear face of the side marginal frame 24 is flat and provides no abutment to receive a seal. To cure this difficulty a substantially rigid sealing member 40 is provided. It has a vertical length substantially equal to the vertical length of member 24 and, as seen in FIGS. 4, 5, and 6, it includes a narrow elongate flat web 42 for engagement with member 24 and an upstanding elongate hollow rib 44. Mounting holes 46 enable it to be secured with screws to member 24 in the position shown in FIG. 3. When it is so mounted the rib 44 extends rearwardly in a plane substantially parallel to the longitudinal axis of the vehicle, and the web and rib define an inside corner 48 in continuation of the inside corner 38 for engagement with the margin of the door. The upper end of the seal member is formed with a rearwardly opening socket 74, the axis of which is substantially horizontal when member 40 is mounted on the windshield, to receive and support the forward end of the horizontal support rod carrying the lintel portion of the door frame.

The skeletal framework of the door is illustrated in FIGS. 7 and 8 in which a length 50 of resilient steel rod is formed into a closed loop to produce a border structure 52 conforming in size and outline to the size and outline of door frame 30, and the ends of the rod are united by welding at any selected position such as point 54. The forward and rear marginal sections 56 and 58 include upper and lower portions 60, 62 and 64, 66. Each section is formed with bends 68, 70 to define two relatively angled planes. Bend 68 is located at about one-half the height of the door, above upper hinge pin 36, and bend 70 is located about two-thirds of the height of the door down from its upper marginal section 72 in the embodiment shown. Of course, it will be understood that different vehicles will have different door configurations which may result in bends corresponding to 68 and 70 being located at different positions along the forward and rear portions of the door frame.

In FIG. 8 it will be seen that the lower portions 62 and 66 lie in a vertical reference plane corresponding to the plane of the lower portion of the door frame, while portions 60 and 64 lie substantially in a plane which is angled upwardly and inwardly with respect to the reference plane and thus toward the center line of the vehicle when the door is in mounted position. The two bend points define a theoretical line of bend 76. The angular relation of the upper and lower planes produces interference contact of the upper part of the door and the resilience of the steel rod material allows springing of the door to complete its closure as will be explained subsequently.

A first steel rod bracing element 78 is connected, preferably by welding, at its fore and aft ends to the forward and rear marginal sections 56 and 58 to assist in maintaining the outline shape of the border structure. As shown, the aft connection is at a point about one-half of the height of the door and the forward connection is at a point adjacent to the lower hinge pin. Preferably a second bracing element is also provided in the form of rod 80 which extends generally horizontally across the mid portion of the framework and is connected at its forward end to section 56 and at its aft end to the aft portion of rod 78 as shown, or it could be connected to rear marginal section 58. A latch casing 82 is located within the margin of portion 64 and is welded thereto in the plane of the framework. The door is completed by placing a layer of fabric covering 84 over the outer side of the framework, folding the margins of the fabric over the margins of the door, and sewing it in place as illustrated in FIG. 3. A window 86 is provided in the upper portion of the covering, and a panel 88 with a pocket 90 may be secured to the inner side of the lower portion. It will be seen by reference to FIGS. 7 and 8 that hinge pins 36 are offset outwardly and forwardly so that when the door is closed its general plane will lie within the general plane of the door frame so that it is shielded from the relative wind of rapid forward motion.

The operation of the door in accomplishing its superior sealing function will now be described with reference to FIGS. 3, 9, and 10. As previously noted sill 18 and upright portion 20 of the door frame provide an inside corner on the sill and part of the forward upright. The provision of sealing member 40 with its web 42 and rib 44 continues this inside corner to the top of the forward upright. While the invention works in the same way and equally as well with a door frame which lies entirely in a single plane, in the present example the upper portion of the door frame lies in a plane which is angled upwardly and inwardly.

In FIGS. 9 and 10 the door is shown in solid lines and the door frame is shown in phantom lines. Considering FIG. 9 it will be seen that because of the inward angling of the upper portion of the door, which is chosen to be greater than that of the upper portion of the frame, the upper forward corner 92 of the door will make interference contact with the corresponding corner of the door frame at point 94 in advance of contact by any other parts of the door and frame, and the door will be substantially in the position shown. Because of the resiliency of the material of the framework the upper portion of the door will yield as the middle and lower portions are pushed or pulled to full closure position. When the door is closed and latched, all of the lower portions are in good sealing contact with the frame and the upper portions are in very tight sealing contact because of the high spring force trying to restore the door to its original angled shape. The greatest pressure and consequently the best sealing is at the point of contact 94 between the corner 92 of the door and the upper end of rib 44, and the spring pressure is high all along the length of the rib. Thus the sealing is best in the area where the need for sealing is most critical.

The invention will operate in the same way with a door frame which lies in a single plane. In such case the angle of the plane of the upper portion of the door is less because the principle of operation which applies to all combinations is that the angularity of the upper portion of the door is greater than that of the upper portion of the door frame. It is the relative angularity which produces the desired result.

The invention has been described in detail with particular reference to a preferred embodiment thereof, but it will be understood that variations and modifications can be effected within the spirit and scope of the invention.

What is claimed is:

1. In an automotive utility vehicle, the combination of:
    a vehicle door frame defining an opening for ingress and egress and a door pivotally mounted on the vehicle about a vertical axis and movable between first and second positions to provide access and to close the opening;
    the door frame being of predetermined size and outline and having a sill, a lintel, and forward and rear uprights to form a closed figure;
    the door being of substantially the same size and outline as the door frame and comprising a skeletal framework of resilient material including a border structure having upper and lower portions, and a fabric covering secured to the framework;
    the lower portions of the forward and rear marginal sections of the framework lying in a substantially vertical plane to mate with corresponding sections of the door frame, and the upper portions of the marginal sections being angled upwardly and inwardly out of said vertical plane and toward the door frame sufficiently to cause interference contact of the upper marginal portion of the door with the door frame in advance of complete closure of the lower portion of the door;
    the resilience of the framework being sufficient to permit complete closing and latching of the door and to yieldingly force the upper marginal portion of the door into tight sealing relation with the door frame.

2. The combination as claimed in claim 1; in which
    the lower portion of the door frame lies in a second substantially vertical plane and the upper portion is angled upwardly and inwardly out of said second vertical plane;
    and the upward and inward angle of the upper portion of the door is greater than that of the upper portion of the door frame.

3. The combination as claimed in claim 1; in which
    the lower portion of the forward marginal section of the framework is provided with a pair of vertically spaced outwardly and forwardly offset vertical hinge pins to engage in the hinge mountings on the vehicle;
    the offsets being sufficient to locate the general plane of the closed door within the general plane of the door frame.

4. The combination as claimed in claim 1; in which
    the vehicle is provided with a fabric top connected to the body and to the upper margin of the windshield, portions of the top defining the lintel and the rear upright;
    the outer edge of the windshield defines the upper portion of the forward upright;
    and a seal member is secured to the inner face of the windshield edge and extends throughout its vertical length;
    the seal member being formed throughout its length with a substantially rigid rib extending rearwardly in a plane generally parallel to the longitudinal axis of the vehicle to firmly engage the corresponding portion of the door in closed position and produce a positive weather seal.

5. The combination as claimed in claim 4; in which
    the upper forward corner of the door engages the outer face of the upper end of the rib in advance of contact between the other portions of the door and the door frame.

6. The combination as claimed in claim 4; in which
    the upper end of the seal member is formed with a rearwardly opening socket to receive and support the forward end of the horizontal support rod carrying the lintel portion of the door frame.

7. A reinforced fabric door for use in combination with a door frame of an automotive utility vehicle, comprising:
    a skeletal framework of resilient material and a fabric covering secured thereto and overlying the major portion thereof to form a door having inner and outer sides;
    the framework including a border structure having an outline conforming to the predetermined outline of the vehicle door frame to which it is to be applied;
    the forward and rear marginal sections of the border structure being formed with bends at intermediate points to provide lower portions lying in a substantially vertical reference plane and upper portions lying substantially in a plane angled upward and inward with respect to the reference plane;
    the angle of bend being predeterminedly sufficient to cause interference contact of the upper marginal portion of the door with a door frame to which it is to be applied in advance of complete closure of the door;
    the resilience of the material of the framework being sufficient to permit springing of the door to mate with the door frame in response to complete closure movement.

8. A door as claimed in claim 7; in which
    the bend point of the forward marginal section and the bend point of the rear marginal section conform to the location of the bends of the forward and rear marginal sections to define a theoretical line of bend.

9. A door as claimed in claim 8; in which
    the lower portion of the forward marginal section of the border structure is provided with upper and lower outwardly and forwardly offset vertical hinge pins to engage in the hinge mountings of a vehicle;
    and the bend point of the forward marginal section is above the upper hinge pin.

10. A door as claimed in claim 7; in which
    a first elongate bracing element is connected at its aft end to the rear marginal section at a point about one-half of the height of the door and at its forward end to the forward marginal section adjacent to the lower end of the door; and
    a second elongate bracing element extends generally horizontally across the mid portion of the framework and is connected at its forward end to the forward marginal section at a point about one-half of the height of the door and at its aft end to the aft portion of the first bracing element.

11. A door as claimed in claim 9, further including: latch means on the rear marginal section of said border structure intermediate the ends thereof and releasably engageable with the door frame to hold the door in sprung sealing engagement with the door frame.

* * * * *